(12) United States Patent
Taoka et al.

(10) Patent No.: US 9,989,962 B2
(45) Date of Patent: Jun. 5, 2018

(54) SELF-TRAVELING CLEANER, CONTROLLING APPARATUS, AND AUTOMATIC CLEANING SYSTEM

(71) Applicant: Panasonic Intellectual Property Management Co., Ltd., Osaka (JP)

(72) Inventors: Hiroki Taoka, Kyoto (JP); Hiroyuki Kayama, Osaka (JP); Ichiro Takei, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 484 days.

(21) Appl. No.: 14/672,226

(22) Filed: Mar. 30, 2015

(65) Prior Publication Data

US 2015/0289743 A1    Oct. 15, 2015

(30) Foreign Application Priority Data

Apr. 11, 2014    (JP) ................. 2014-082243

(51) Int. Cl.
| | |
|---|---|
| *G05D 1/00* | (2006.01) |
| *A47L 9/19* | (2006.01) |
| *A47L 9/28* | (2006.01) |
| *G05D 1/02* | (2006.01) |

(52) U.S. Cl.
CPC .............. *G05D 1/0022* (2013.01); *A47L 9/19* (2013.01); *A47L 9/2826* (2013.01); *G05D 1/0297* (2013.01); *A47L 2201/04* (2013.01); *A47L 2201/06* (2013.01); *G05D 2201/0203* (2013.01)

(58) Field of Classification Search
CPC ..................................... A47L 9/2826
See application file for complete search history.

(56) References Cited

U.S. PATENT DOCUMENTS 9,043,021 B1 *   5/2015   Clark ............... G06Q 10/06311
                                                        700/101

FOREIGN PATENT DOCUMENTS

| | | |
|---|---|---|
| JP | 2005-124753 | 5/2005 |
| JP | 2013-158638 | 8/2013 |

* cited by examiner

*Primary Examiner* — Andrew A Horton
(74) *Attorney, Agent, or Firm* — Greenblum & Bernstein, P.L.C.

(57) ABSTRACT

An automatic cleaning system is configured by a single controlling apparatus, and a plurality of self-traveling cleaners. When the controlling apparatus has received from a self-traveling cleaner a dust location signal containing a dust location detected by the self-traveling cleaner, it writes the received information into a storage unit. When the controlling apparatus has received from one of the plurality of self-traveling cleaners, with respect to dust which is not removed by any self-traveling cleaner, a signal requesting a reservation of removing the dust, the controlling apparatus will not accept from any other of the plurality of self-traveling cleaners a signal requesting a reservation of removing the dust, until receiving from the one self-traveling cleaner information indicating that removing of the dust has been completed or information indicating that the removing of the dust has been stopped.

6 Claims, 9 Drawing Sheets

*FIG. 3*

| ID | DUST LOCATION | | CLEANING STATE |
|---|---|---|---|
| | LATITUDE | LONGITUDE | |
| 200-1 | $xx_1$ | $yy_1$ | CLEANING COMPLETED |
| 200-2 | $xx_2$ | $yy_2$ | DUST REMAINING |
| 200-3 | $xx_3$ | $yy_3$ | DURING CLEANING |
| 200-4 | $xx_4$ | $yy_4$ | DURING CLEANING |
| ⋮ | ⋮ | ⋮ | ⋮ |

FIG. 7

| BLOCK NO. | BLOCK LOCATION ||||| AMOUNT OF DUST | CLEANING STATE | ID |
|---|---|---|---|---|---|---|---|---|
| | END POINT LATITUDE | END POINT LONGITUDE | WIDTH | HEIGHT | DEPTH | | | |
| 1 | xx1 | yy1 | a1 | b1 | c1 | NORMAL | DUST DETECTION | 300-1 |
| 2 | xx2 | yy2 | a2 | b2 | c2 | LARGE | DUST REMAINING | 200-1 |
| 3 | xx3 | yy3 | A3 | b3 | c3 | NORMAL | DUST DETECTION | 300-2 |
| 4 | xx4 | yy4 | a4 | b4 | c4 | 0 | CLEANING COMPLETED | 200-2 |
| 5 | xx5 | yy5 | a5 | b5 | c5 | SMALL | DURING CLEANING | 200-3 |
| 6 | xx6 | yy6 | a6 | b6 | c6 | SMALL | DUST DETECTION | 300-1 |
| ... | ... | ... | ... | ... | ... | ... | ... | ... |

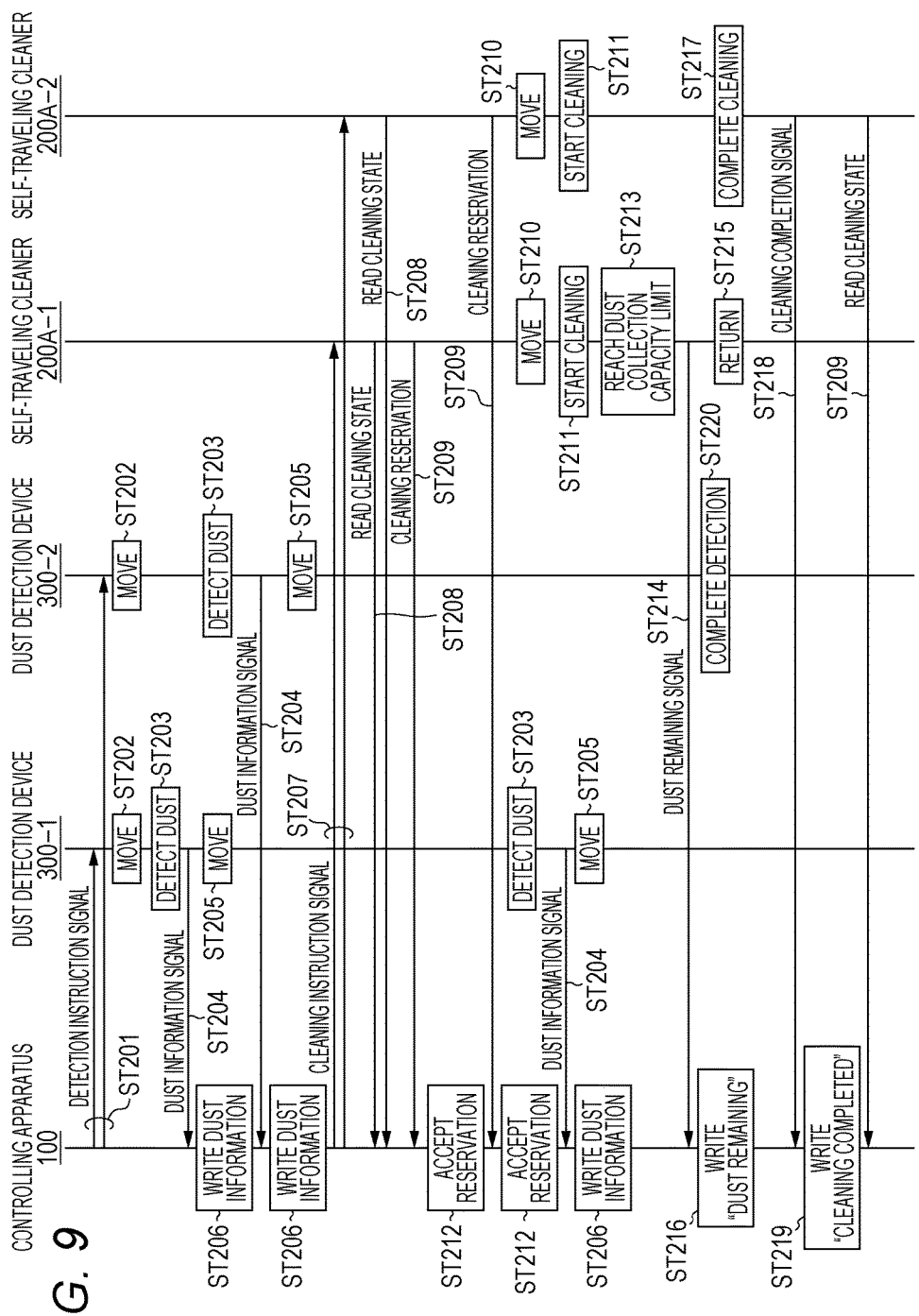

SELF-TRAVELING CLEANER, CONTROLLING APPARATUS, AND AUTOMATIC CLEANING SYSTEM

BACKGROUND

1. Technical Field

The present disclosure relates to a self-traveling cleaner, a controlling apparatus, and an automatic cleaning system.

2. Description of the Related Art

In recent years, such self-traveling cleaners have been widely used that can autonomously travel on a floor or the like while performing cleaning without any guidance by human.

PTL 1 discloses a technique to divide a cleaning area by a plurality of self-traveling cleaners which are different in size from one another.

CITATION LIST

Patent Literatures

PTL 1: Unexamined Japanese Patent Publication No. 2005-124753

PTL 2: Unexamined Japanese Patent Publication No. S61-146686

PTL 3: Unexamined Japanese Patent Publication No. 2013-158638

SUMMARY

However, the conventional self-traveling cleaners cannot efficiently perform cleaning. Particularly, the conventional self-traveling cleaners cannot efficiently remove dust accumulated in a narrow space.

One non-limiting and exemplary embodiment provides a self-traveling cleaner which can efficiently perform cleaning, and more particularly, a self-traveling cleaner which can efficiently remove dust accumulated in a narrow space.

Additional benefits and advantages of the disclosed embodiments will be apparent from the present specification and drawings. The benefits and/or advantages may be individually provided by various embodiments and features disclosed in the specification and drawings, and need not all be provided in order to obtain one or more of the same.

In an embodiment according to the present disclosure, a self-traveling cleaner includes: a traveling unit that moves the self-traveling cleaner; a dust detector that detects dust; a dust collector that performs a cleaning function; a communication unit that communicates with a controlling apparatus that communicates with a plurality of self-traveling cleaners including the self-traveling cleaner; and a controller that controls the traveling unit, the dust detector, the dust collector, and the communication unit, wherein, when the dust detector has detected the dust, the controller transmits, to the controlling apparatus through the communication unit, a signal containing a location of the dust, information identifying the self-traveling cleaner, and information indicating that the self-traveling cleaner performs removing of the dust, and controls the dust collector to collect the dust.

Comprehensive or specific embodiments of these may be realized as an apparatus, a system, a method, an integrated circuit, a computer program, or a computer-readable storage medium, or may be realized as an arbitrary combination of an apparatus, a system, a method, an integrated circuit, a computer program and a computer-readable storage medium. The computer-readable storage medium may include a non-volatile storage medium, such, for example, as a CD-ROM (Compact Disc-Read Only Memory).

According to the present disclosure, a plurality of self-traveling cleaners can cooperate to clean a place where dust is accumulated. This makes it possible to simultaneously clean a plurality of dust accumulated places, and thus to efficiently perform cleaning. Also, each cleaner may have a smaller-size dust container, so that each self-traveling cleaner can be small-sized. Consequently, it become possible to remove dust accumulated in a narrow space, such as a space between furniture/fixture and a floor or a space between a wall and furniture/fixture, which is difficult to be cleaned by the conventional cleaners.

BRIEF DESCRIPTION OF DRAWINGS

FIG. 3 is a diagram showing an example of dust location administration table which is stored in the controlling apparatus in accordance with the first exemplary embodiment of the present disclosure;

FIG. 7 is a diagram showing an example of cleaning block administration table which is stored in a controlling apparatus in accordance with the second exemplary embodiment of the present disclosure;

FIG. 9 is a sequence diagram showing operations of the automatic cleaning system in accordance with the second exemplary embodiment of the present disclosure.

DETAILED DESCRIPTION

Underlying Knowledge Forming Basis of the Present Disclosure

The conventional self-traveling cleaners, which are each required to have a size larger than a specified size, cannot remove dust accumulated in a narrow space, such as a space between furniture/fixture and a floor or a space between a wall and furniture/fixture. On the other hand, if a self-traveling cleaner is small-sized so as to allow it to fit to the narrow space, its cleaning capability such as the suction power will reduce. Also, the battery capacity required for the self-traveling will reduce, so that the operable time will reduce. Accordingly, it becomes necessary to frequently recharge the battery, so that it will take a very long time to complete cleaning of an entire room.

PTL 1 discloses a system in which a smaller self-traveling cleaner of a plurality of self-traveling cleaners having different sizes from one another decides an area within which a larger self-traveling cleaner can move, and transmits the decided information to the larger self-traveling cleaner. In this manner, a cleaning area is divided by the plurality of self-traveling cleaners.

However, even if the cleaning area is divided by the plurality of self-traveling cleaners depending on the sizes of the self-traveling cleaners as disclosed in PTL 1, a room in which dust is accumulated cannot efficiently and adequately be cleaned up. To perform cleaning with a limited battery capacity within a limited time, it is necessary to give priority to cleaning of a dustier place. Also, under the condition that a small-size self-traveling cleaner does not have an adequate cleaning capability, some dust may possibly be left after completion of cleaning by one self-traveling cleaner.

Hereinafter, exemplary embodiments in accordance with the present disclosure will be described in detail with reference to the drawings.

First Exemplary Embodiment

Outline of Automatic Cleaning System

Figure 1:
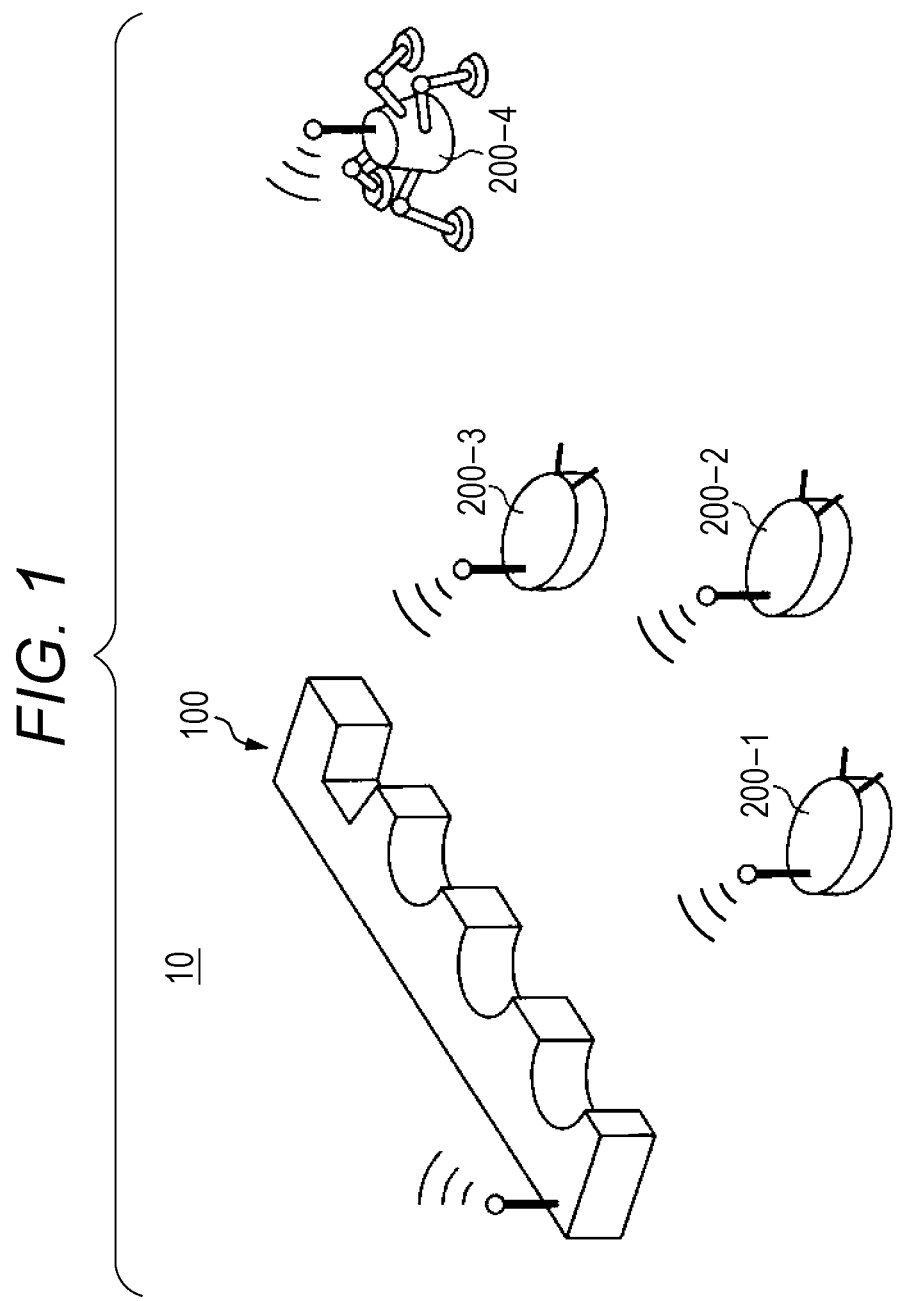
FIG. 1 is a schematic diagram showing an outline of an automatic cleaning system in accordance with a first exemplary embodiment of the present disclosure.

FIG. 1 is a schematic diagram showing an outline of an automatic cleaning system in accordance with a first exemplary embodiment of the present disclosure. As shown in FIG. 1, automatic cleaning system 10 is configured by single controlling apparatus (server) 100, and a plurality of (four in FIG. 1) self-traveling cleaners 200 (200-1, 200-2, 200-3 and 200-4).

Controlling apparatus 100 is installed at a specified place, wirelessly communicates with each of self-traveling cleaners 200, and instructs each of self-traveling cleaners 200 to start dust detection. In addition, controlling apparatus 100 manages access requests from the plurality of self-traveling cleaners 200 so as to allow only one self-traveling cleaner 200 to access one block (a small area to be cleaned).

Each self-traveling cleaner 200, instructed by controlling apparatus 100 to start dust detection, starts moving in an arbitrary direction, and autonomously travels around obstacles to perform dust detection and cleaning. The arbitrary direction means a random direction which is decided by self-traveling cleaner 200 at specified time intervals by using, for example, random numbers. When each self-traveling cleaner 200 detects an obstacle existing in its moving direction, it performs, for example, a random turn to move in a different direction, and continues dust detection and cleaning. Also, each self-traveling cleaner 200 returns, when its dust container is filled with dust, to a waiting position (controlling apparatus 100).

Configuration of Controlling Apparatus 100

Figure 2:
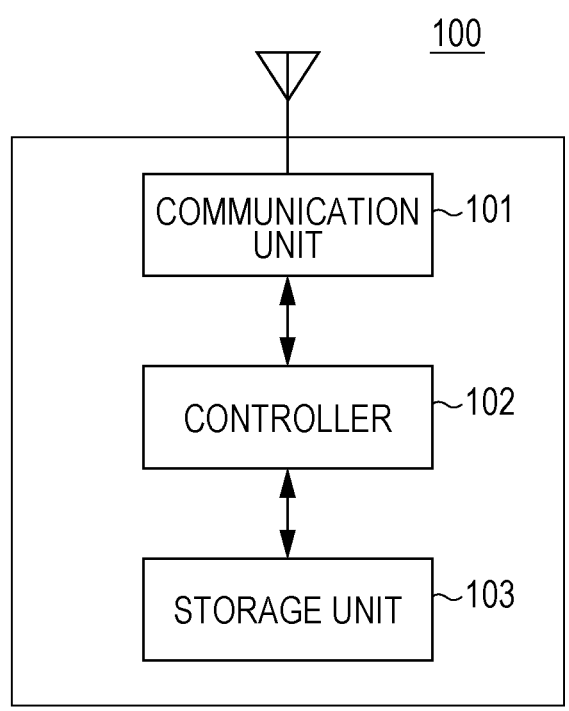
FIG. 2 is a block diagram showing a configuration of a controlling apparatus in accordance with the first exemplary embodiment of the present disclosure.

FIG. 2 is a block diagram showing a configuration of controlling apparatus 100 in accordance with the present exemplary embodiment. Controlling apparatus 100 is configured mainly by communication unit 101, controller 102, and storage unit 103.

Communication unit 101 wirelessly transmits a signal output from controller 102 to each self-traveling cleaner 200 through an antenna. In addition, communication unit 101 outputs to controller 102 a signal wirelessly-received from each self-traveling cleaner 200 through the antenna.

Storage unit 103 is a ROM (Read Only Memory) or a RAM (Random Access Memory), and stores information written by controller 102. Particularly, storage unit 103 stores information regarding a dust location as shown in FIG. 3 in a tabular format (hereinafter referred to as "dust location administration table").

Correlated data stored in the dust location administration table include an ID (Identification) of self-traveling cleaner 200 in charge of removing dust, a location (latitude and longitude) of the dust, and a cleaning state of the location. In the following description, the term "location of dust" or "dust location" means an area in which dust is accumulated around a point indicated by latitude and longitude.

In each field of the cleaning state, either one of three states including "cleaning completed", "dust remaining" and "during cleaning" states is written by controller 102. The "cleaning completed" state means that removing of dust has been completed by self-traveling cleaner 200 in charge of cleaning. The "dust remaining" state means that a dust container of dust collector 209 (see FIG. 4) of self-traveling cleaner 200 in charge of cleaning has been filled with dust, and some dust still remains. The "during cleaning" state means that self-traveling cleaner 200 in charge of cleaning is now removing dust. Incidentally, according to the present exemplary embodiments, the cleaning state may not be limited to these three states, but may additionally include other states such, for example, as a "cleaning started" state.

When cleaning is to be started, controller 102 transmits a detection instruction signal instructing to start dust detection to each of self-traveling cleaners 200 through communication unit 101.

When controller 102 has received a dust location signal (described later) from each self-traveling cleaner 200, controller 102 writes a dust location (latitude and longitude) and an ID of self-traveling cleaner 200 which has detected the dust into the dust location administration table of storage unit 103, and sets the cleaning state to the "during cleaning" state (acceptance of a reservation). When controller 102 has received a dust remaining signal (described later) from each self-traveling cleaner 200, controller 102 rewrites the cleaning state corresponding to the dust location indicated in the dust remaining signal to the "dust remaining" state. When controller 102 has received, from each self-traveling cleaner 200, a cleaning reservation signal (described later) with respect to the dust location where the cleaning state is the "dust remaining" state, controller 102 rewrites the ID corresponding to the dust location indicated in the dust reservation signal to an ID of self-traveling cleaner 200 which has transmitted the cleaning reservation signal, and rewrites the cleaning state corresponding to the dust location indicated in the cleaning reservation signal to the "during cleaning" state (acceptance of a reservation). When controller 102 has received a cleaning completion signal (described later) from each self-traveling cleaner 200, controller 102 rewrites the cleaning state corresponding to the dust location indicated in the cleaning completion signal to the "cleaning completed" state. The dust location may be expressed as an absolute location in a coordinate system defined in a room space to be cleaned or may be a relative location relative to a certain reference point.

Configuration of Self-Traveling Cleaner 200

Figure 4:
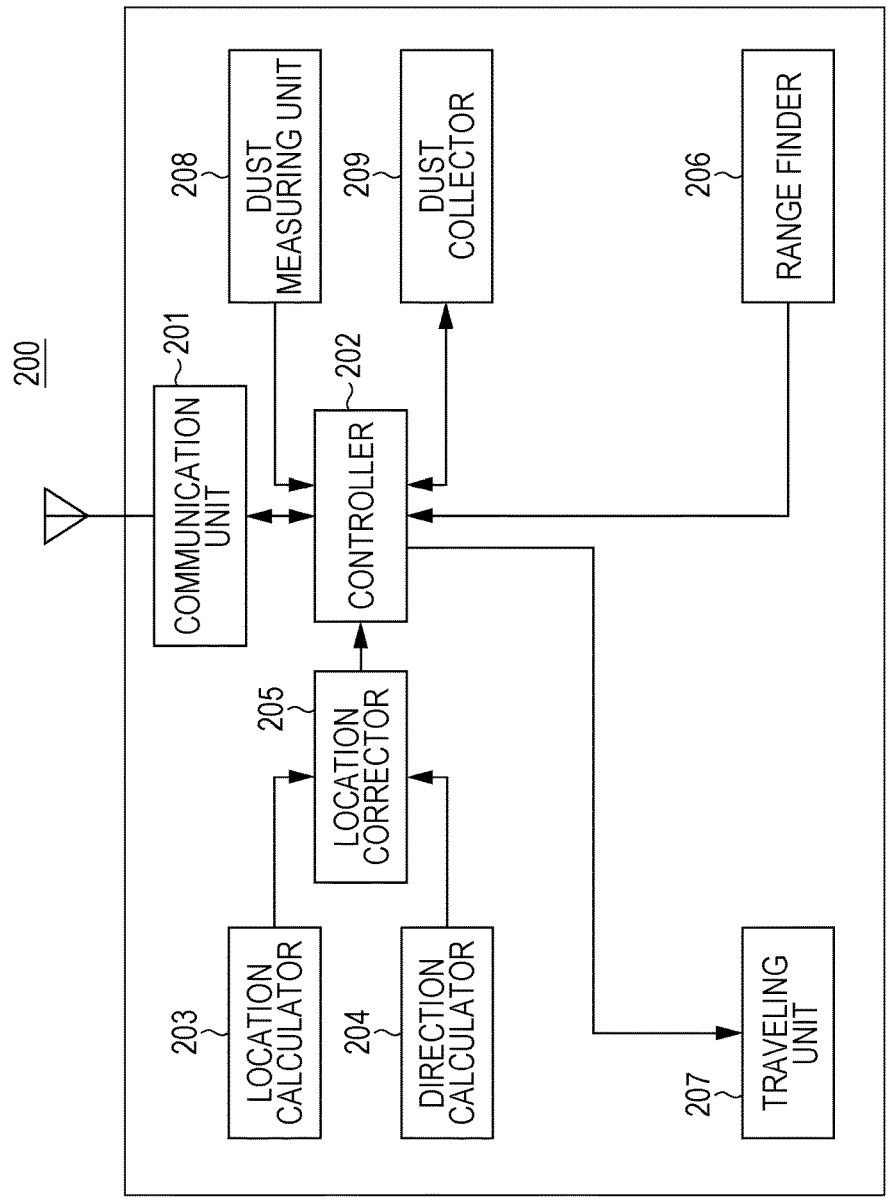
FIG. 4 is a block diagram showing a configuration of a self-traveling cleaner in accordance with the first exemplary embodiment of the present disclosure.

FIG. 4 is a block diagram showing a configuration of self-traveling cleaner 200 in accordance with the present exemplary embodiment. Self-traveling cleaner 200 is configured mainly by communication unit 201, controller 202, location calculator 203, direction calculator 204, location corrector 205, range finder 206, traveling unit 207, dust measuring unit 208, and dust collector 209.

Communication unit 201 wirelessly transmits a signal output from controller 202 to controlling apparatus 100 through an antenna. Also, communication unit 201 outputs to controller 202 a signal wirelessly-received from controlling apparatus 100 through the antenna.

When controller 202 has received a detection instruction signal from controlling apparatus 100, controller 202 decides a moving condition (such, for example, as direction and velocity) of its own self-traveling cleaner, produces a signal for controlling traveling unit 207, and outputs the produced signal to traveling unit 207. When controller 202 has detected that the distance from its own self-traveling cleaner to an obstacle (e.g., wall, fixture or furniture) is smaller than a specified value based on the measurement result of range finder 206, controller 202 produces a signal instructing to change the moving direction so as to avoid the obstacle, and outputs the produced signal to traveling unit 207.

When controller 202 has detected accumulated dust, controller 202 transmits to controlling apparatus 100 through communication unit 201 a dust location signal containing a location of the dust, an ID of its own self-traveling cleaner, and information of making a reservation to be in charge of removing the dust. Also, controller 202 instructs dust collector 209 to perform a cleaning function of collecting dust.

Also, controller 202 reads the dust location administration table in storage unit 103 of controlling apparatus 100 through communication unit 201 at a predetermined timing such, for example, as at constant intervals of time or at constant intervals of distance to check whether or not the "dust remaining" state is included in the cleaning state. If the "dust remaining" state is found, controller 202 requests controlling apparatus 100 for a reservation to become in charge of removing the dust at the dust location where the cleaning state is the "dust remaining" state. This reservation is made by transmitting to controlling apparatus 100 a cleaning reservation signal requesting to write the ID of its own self-traveling cleaner into the ID of the dust location administration table and to make the cleaning state to be the "during cleaning" state. The cleaning reservation signal may contain information identifying dust (including the remaining dust) such, for example, as dust location information, an ID of a self-traveling cleaner which performs removing of the dust (including the remaining dust), and information indicating that the self-traveling cleaner identified by the self-traveling cleaner ID performs removing of the dust (including the remaining dust). If this request is accepted by controlling apparatus 100, controller 202 instructs direction calculator 204 to calculate the reserved direction of the dust location, produces a signal for moving its own self-traveling cleaner in the calculated direction, and outputs the produced signal to traveling unit 207. In this manner, according to the present exemplary embodiment, self-traveling cleaner 200 having made a reservation is in charge of cleaning the location in the "dust remaining" state. Therefore, in a case where some dust remains (in a case of the "dust remaining" state) at a location having been cleaned by self-traveling cleaner 200 because its dust container is filled with dust, the cleaner to be in charge of cleaning the location is changed to another self-traveling cleaner.

Also, controller 202 produces a signal for controlling dust collector 209 based on a dust measured value output from dust measuring unit 208, and outputs the produced signal to dust collector 209. When the dust container of dust collector 209 is filled with dust, controller 202 transmits to controlling apparatus 100 through communication unit 201 a dust remaining signal containing the dust measured value output from dust measuring unit 208 and the ID of its own self-traveling cleaner. The dust remaining signal may contain information identifying dust (including the remaining dust) such, for example, as dust location information, an ID of a self-traveling cleaner which performs removing of the dust (including the remaining dust), and information indicating existence of the remaining dust (information indicating that the self-traveling cleaner identified by the self-traveling cleaner ID has become unable to continue cleaning, and that the dust remains at the dust location).

When dust measuring unit 208 becomes in a condition of detecting no dust, controller 202 determines that cleaning has been completed, and transmits a cleaning completion signal indicating completion of cleaning to controlling apparatus 100 through communication unit 201. The cleaning completion signal may contain information identifying dust (including the remaining dust) such, for example, as dust location information, an ID of a self-traveling cleaner which has performed removing of the dust (including the remaining dust), and information indicating that the self-traveling cleaner identified by the self-traveling cleaner ID has completed removing of the dust (including the remaining dust).

Location calculator 203 is, for example, an encoder which is equipped on a moving wheel to count the number of rotations, or a GPS receiver which receives location information from a satellite of the GPS system, and calculates the current location of its own self-traveling cleaner.

Direction calculator 204 calculates the moving direction of its own self-traveling cleaner by using a sensor that detects an amount of direction change, such, for example, as a gyro sensor or an acceleration sensor.

Location corrector 205 corrects the calculation result of location calculator 203 based on the calculation result of direction calculator 204 to decide the current location of its own self-traveling cleaner. This makes it possible to improve accuracy of the location calculation. Location corrector 205 outputs location information indicating the current location of its own self-traveling cleaner to controller 202. Incidentally, location corrector 205 may obtain the latitude and longitude of a wall or furniture/fixture from controlling apparatus 100, and correct the location by using range finding and object recognition with a plurality of cameras to recognize the current location of its own self-traveling cleaner more accurately (within an error of several centimeters).

Range finder 206 measures a distance from its own self-traveling cleaner to an obstacle, and outputs a signal indicating the measured result to controller 202. Range finder 206 may be configured by, for example, a sensor that captures an image such, for example, as a CCD camera, a range sensor that can measure the distance to the obstacle by using reflection of a light beam, an ultrasonic sensor that can measure the distance to the obstacle by using reflection of an ultrasonic wave, or a contact sensor acting as a bumper that detects a contact with an obstacle by detecting a switch operation or a voltage change when its own self-traveling cleaner comes in contact with the obstacle. Other sensors that can be used for range finder 206 include, for example, those sensors utilizing a laser beam, an electromagnetic wave, or a magnetic force. A plurality of different types of sensors among the above-mentioned sensors may be mounted on self-traveling cleaner 200 so that their detection capabilities are complemented with one another to improve the detection accuracy.

Traveling unit 207 may be configured, for example, by two motors, and two moving wheels disposed horizontally on the right and left sides, and may change the numbers of rotations of the two motors based on a control of controller 202 to operate the moving wheel and to move its own self-traveling cleaner. Other than the configuration by the motors and moving wheels, traveling unit 207 may be configured so as to be capable of moving by multiple legs such, for example, as two legs or four legs each configured by anthropomorphic actuators using a plurality of servo motors as disclosed in PTL 2. Also, traveling unit 207 may be provided at an end of each leg with a sucker or claw mechanism as disclosed in PTL 3 so as to be capable of climbing a wall, a side surface of furniture/fixture, or a glass surface.

Dust measuring unit 208 measures an amount of dust accumulated at the current location of its own self-traveling cleaner. Dust measuring unit 208 outputs a signal indicating a measured value (a dust measured value) of the amount of dust to controller 202.

Dust collector 209 is a part that performs a cleaning function to collect dust, and mainly includes, although not shown in the drawings, a drive motor, a rotational brush, an electric fan, a dust container, and a filter. Dust collector 209 drives the drive motor based on a control of controller 202 to rotate the rotational brush and to start the electric blower. Dust on a surface to be removed is taken into the dust container by the rotation of the rotational brush. The electric fan generates a stream of air which is sucked through an intake port, guided into the dust container through an inflow path, passed through the filter, and discharged to the outside through an exhaust path and an exhaust port.

When the amount of collected dust has exceeded a capacity of the dust container, dust collector 209 will output a signal indicating this state to controller 202.

Operation Flow of Automatic Cleaning System

Next, an operation flow of the automatic cleaning system will be described with reference to a sequence diagram shown in FIG. 5. In the example shown in FIG. 5, the automatic cleaning system is configured by single controlling apparatus 100, and four self-traveling cleaners 200-1, 200-2, 200-3 and 200-4. Before starting cleaning, controlling apparatus 100 resets the dust location administration table.

First, controlling apparatus 100 transmits a detection instruction signal instructing to start dust detection to each of self-traveling cleaners 200 (ST101).

Each self-traveling cleaner 200 having received the detection instruction signal moves in an area to be cleaned, and performs dust detection (ST102).

Each of self-traveling cleaners 200-1 and 200-2, which has detected accumulated dust during the dust detection (ST103), transmits a dust location signal to controlling apparatus 100 (ST104), and starts to remove the dust (ST105).

Controlling apparatus 100 having received the dust location signal writes, as acceptance of reservation, a dust location and an ID of self-traveling cleaner 200 which are indicated in the dust location signal into the dust location administration table, and sets the cleaning state to the "during cleaning" state (ST106).

On the other hand, each of self-traveling cleaners 200-3 and 200-4, which have not detected any dust, reads the dust location administration table at regular intervals to check whether or not there is the "dust remaining" state in the cleaning state (ST107).

Figure 5:
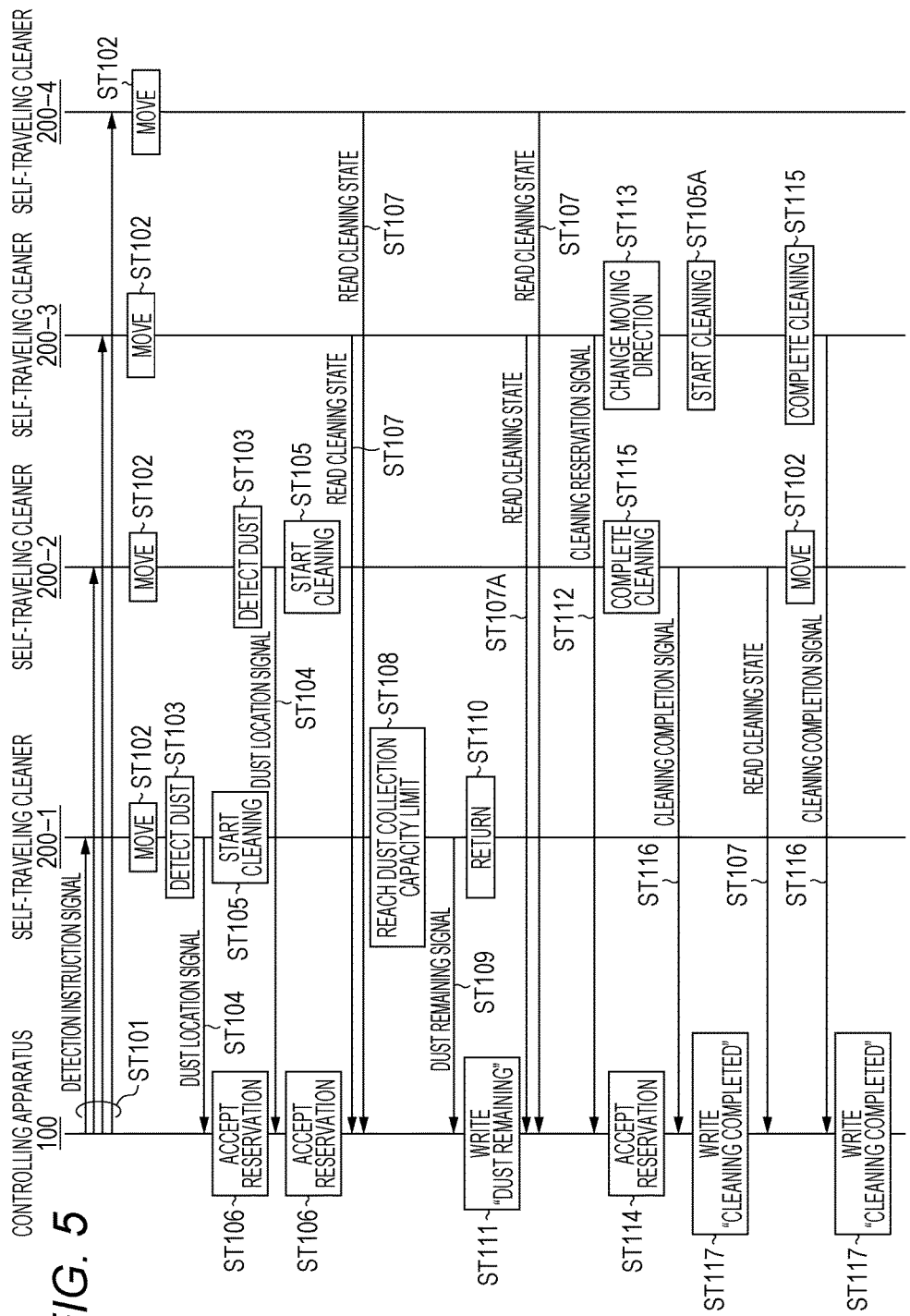
FIG. 5 is a sequence diagram showing operations of the automatic cleaning system in accordance with the first exemplary embodiment of the present disclosure.

Assume here that, with reference to FIG. 5, the dust container of self-traveling cleaner 200-1 is filled with dust (reaches a dust collection capacity limit) although some dust still remains (ST108). In this case, self-traveling cleaner 200-1 transmits a dust remaining signal to controlling apparatus 100 (ST109), and returns to a specified waiting position (ST110).

Controlling apparatus 100 having received the dust remaining signal rewrites the cleaning state corresponding to the information identifying the dust indicated by the dust remaining signal (e.g., the dust location information) in the dust location administration table to the "dust remaining" state (ST111).

Then, assume that self-traveling cleaner 200-3 among self-traveling cleaners 200 reads the dust location administration table, and confirms the existence of the "dust remaining" state in the cleaning state (ST107A). In this case, self-traveling cleaner 200-3 transmits a cleaning reservation signal to controlling apparatus 100 (ST112), moves to the dust location which is in the "dust remaining" state (ST113), and starts to remove the dust (ST105A).

Controlling apparatus 100 having received the cleaning reservation signal rewrites the ID corresponding to the information identifying the dust (e.g., the dust location information) indicated in the cleaning reservation signal in the dust location administration table to the ID of self-traveling cleaner 200-3, and rewrites the cleaning state to the "during cleaning" state (ST114). Incidentally, after having received the cleaning reservation signal from self-traveling cleaner 200-3, controlling apparatus 100 will not accepts any cleaning reservation signal received from self-traveling cleaner 200-4 with respect to the same dust location.

Also, when self-traveling cleaners 200-2 and 200-3 have completed removing of dust (ST115), each of them transmits a cleaning completion signal to controlling apparatus 100 (ST116), and then continues dust detection (ST102) and reading of the dust location administration table (ST107).

Controlling apparatus 100 having received the cleaning completion signal rewrites, in the dust location administration table, the cleaning state corresponding to the information identifying the dust (e.g., the dust location information) indicated in the cleaning completion signal to the "cleaning completed" state (ST117).

Advantageous Effects

As described hereinabove, according to the present exemplary embodiment, each of self-traveling cleaners 200 performs dust detection and cleaning, so that it is possible to reduce the time necessary for cleaning. Also, according to the present exemplary embodiment, the plurality of self-traveling cleaners 200 can share the dust location administration table of controlling apparatus 100 and cooperatively clean places where dust exists. Accordingly, the dust container of each self-traveling cleaner 200 can be made smaller in size, and thus each self-traveling cleaner 200 itself can be small-sized. In addition, small-sizing of each self-traveling cleaner 200 makes it possible to remove dust adhered to a surface in a narrow space which was conventionally difficult to be adequately cleaned, such, for example, as a space between furniture/fixture and a floor or a gap between a wall and fixture/furniture.

Further, although such a case has been described in the above that automatic cleaning system 10 has controlling apparatus 100, the plurality of self-traveling cleaners 200 may store the same dust location administration table in their respective own memories according to the present exemplary embodiment. Each of self-traveling cleaners 200 having read its own dust location administration table may update dust location administration tables of the other self-traveling cleaners 200 in synchronization with updating of its own dust location administration table. In this case, each of self-traveling cleaners 200 having detected dust may transmit a dust location signal indicating a location and an amount of the dust to the other self-traveling cleaners 200.

Second Exemplary Embodiment

Outline of Automatic Cleaning System

Figure 6:
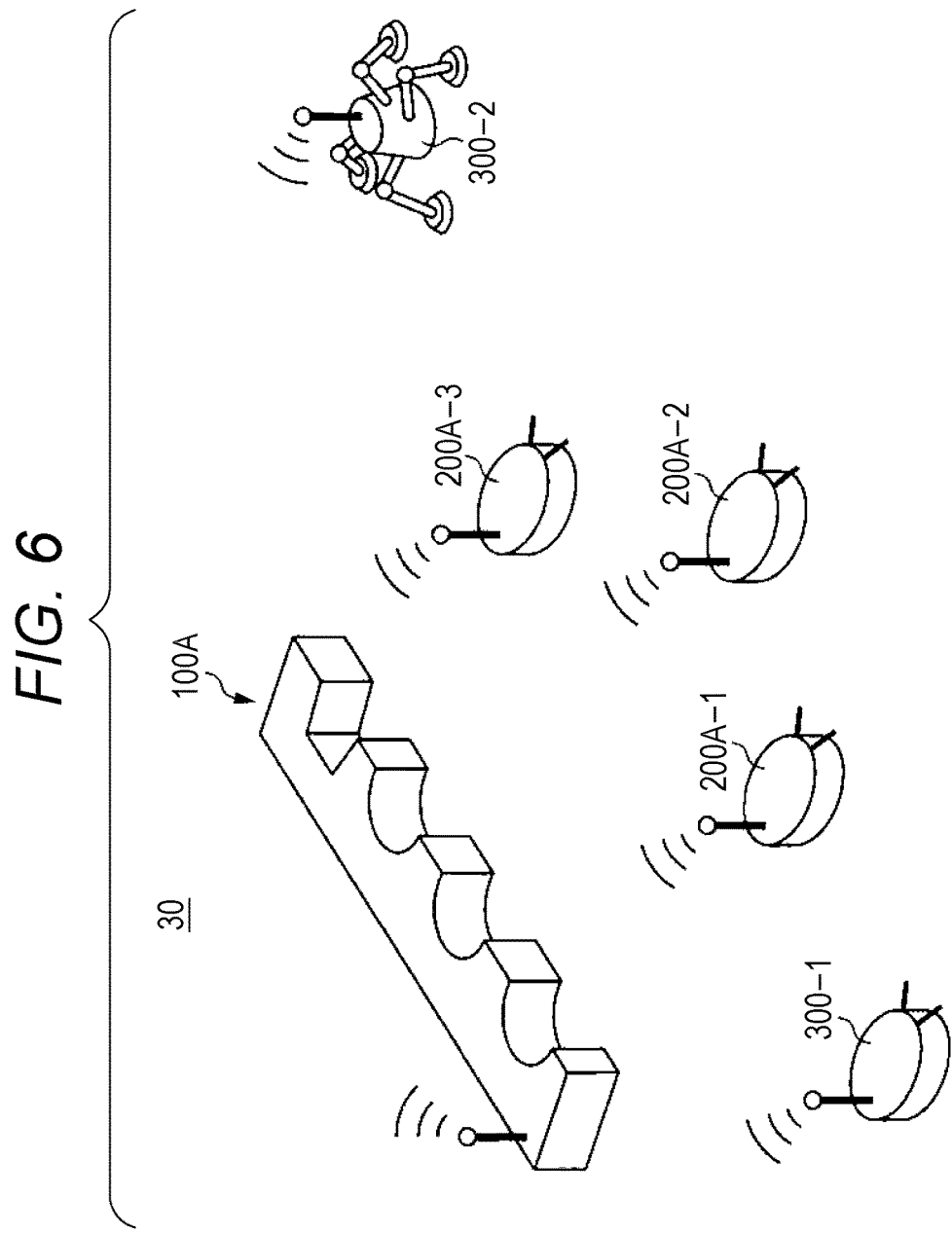
FIG. 6 is a schematic diagram showing an automatic cleaning system in accordance with a second exemplary embodiment of the present disclosure.

FIG. 6 is a schematic diagram showing an automatic cleaning system in accordance with a second exemplary embodiment. In FIG. 6, the same components as those of the first exemplary embodiment (FIG. 1) are indicated by like reference marks, and description of them will be omitted.

Compared to automatic cleaning system 10 shown in FIG. 1, automatic cleaning system 30 shown in FIG. 6 has a configuration in which self-traveling dust detection device 300 is added.

Self-traveling dust detection device 300 does not perform a cleaning work, but concentrates only on detection of dust. Self-traveling dust detection device 300 detects a location with dust based on an instruction by controlling apparatus 100A, and transmits a result of the detection, or a dust information signal, to controlling apparatus 100A.

Configuration of Controlling Apparatus 100A

Controlling apparatus 100A has the same configuration as that of controlling apparatus 100 described in the first exemplary embodiment, and has the same processing functions as those of controlling apparatus 100. Further, controlling apparatus 100A transmits a detection instruction signal instructing to detect dust to self-traveling dust detection device 300, and receives the dust information signal from self-traveling dust detection device 300.

Controlling apparatus 100A makes storage unit 103 to store locations of blocks (small areas), which are objects to be cleaned, such, for example, as narrow spaces in a room space. The location of each block is taught controlling apparatus 100A by a user. Alternatively, controlling apparatus 100A may automatically generate the location of each block based on a 3D (3-dimensional) map of the room space.

Storage unit 103 stores information regarding the block location as shown in FIG. 7 in a tabular format (hereinafter referred to as "cleaning block administration table"). Information correlated to each block in the cleaning block administration table includes a block number, a block location (latitude and longitude of a block end point, width, height and depth of the block), an amount of dust, a cleaning state, and an ID of self-traveling cleaner 200 in charge of cleaning. The number of and positions of the block end points registered in the cleaning block administration table may be arbitrarily decided. In the present exemplary embodiment, for example, the lower left end point of the front surface of each block is registered as the block end point. The location of each block may be expressed as an absolute position in a coordinate system defined in the room space to be cleaned, or may be expressed as a relative position defined from a certain reference point.

When cleaning is to be started, controller 102 transmits a detection instruction signal instructing to start dust detection to each of self-traveling dust detection devices 300 through communication unit 101. Also, controller 102 transmits a cleaning instruction signal instructing to start cleaning to each of self-traveling cleaners 200A through communication unit 101.

When controller 102 has received a dust information signal (described later) from each self-traveling dust detection device 300, controller 102 writes a block number, a block location (latitude and longitude of a block end point, width, height and depth of a block), and an amount of dust of a block into the cleaning block administration table of storage unit 103, and sets the cleaning state to the "dust detected" state. When controller 102 has received a dust remaining signal from each self-traveling cleaner 200A, controller 102 rewrites the cleaning state corresponding to the block location indicated in the dust remaining signal to the "dust remaining" state. When controller 102 has received a cleaning reservation signal from each self-traveling cleaner 200A, controller 102 writes the ID of self-traveling cleaner 200A which has transmitted the cleaning reservation signal into the ID corresponding to the block location indicated in the cleaning reservation signal and rewrites the cleaning state corresponding to the block location indicated in the cleaning reservation signal to the "during cleaning" state. Also, when controller 102 has received a cleaning completion signal from each self-traveling cleaner 200A, controller 102 rewrites the cleaning state corresponding to the block location indicated in the cleaning completion signal to the "cleaning completed" state.

Configuration of Self-Traveling Dust Detection Device 300

Figure 8:
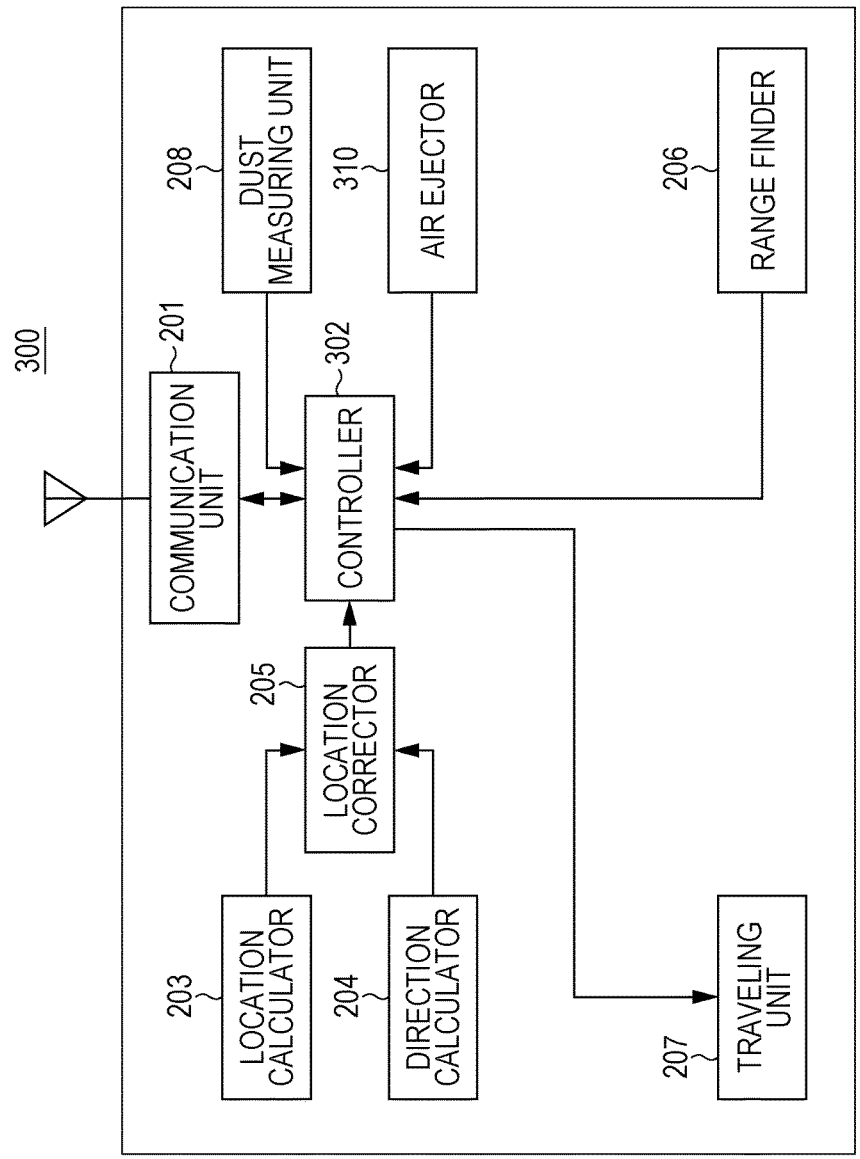
FIG. 8 is a block diagram showing a configuration of a self-traveling dust detection device in accordance with the second exemplary embodiment of the present disclosure.

FIG. 8 is a block diagram showing a configuration of self-traveling dust detection device 300 in accordance with the present exemplary embodiment. In self-traveling dust detection device 300 shown in FIG. 8, the parts common to those of self-traveling cleaner 200 shown in FIG. 4 are indicated by like reference marks, and detailed description of them will be omitted.

Compared to self-traveling cleaner 200, self-traveling dust detection device 300 has a configuration in which dust collector 209 is not provided and air ejector 310 is added.

When controller 302 has received a detection start instruction transmitted from controlling apparatus 100A, controller 302 produces a signal for controlling traveling unit 207 to sequentially move to blocks to clean, and outputs the produced signal to traveling unit 207.

When a dust measured value output from dust measuring unit 208 has exceeded a specified threshold value in each block, controller 302 transmits a dust information signal containing the dust measured value, the block number, and the ID of its own self-traveling dust detection device to controlling apparatus 100A through communication unit 201.

Incidentally, the dust measured value may be a specific numerical value, or may be an expression of magnitude relation to a specific threshold value, such, for example, as "large", "normal" and "small". With respect to a block where removing of dust has been completed, the amount of dust in the cleaning block administration table may be rewritten to "0".

In the present exemplary embodiment, self-traveling dust detection device 300 detects the amount of dust in a block which is difficult to be cleaned by the user, such, for example, as a narrow space in a room space, and a self-traveling cleaner removes the dust there. However, the present disclosure is not limited to this, and can treat any block as a cleaning object. In this case, for example, self-traveling dust detection device 300 may have a function of adding a new block to the cleaning block administration table. This makes it possible to easily expand the cleaning object to the entire room.

Air ejector 310 ejects air to a floor or a wall to float dust in the air.

Dust measuring unit 208 measures the amount of dust floated in the air by air ejector 310, and outputs a signal indicating a dust measured value to controller 202. Incidentally, self-traveling dust detection device 300 may have multiple legs each with a sucker as described before so as to move to detect dust on a wall surface.

Configuration of Self-Traveling Cleaner 200A

Self-traveling cleaner 200A has the same configuration as that of self-traveling cleaner 200 described in the first exemplary embodiment, and has the same processing functions as those of self-traveling cleaner 200. Moreover, self-traveling cleaner 200A records its own size (width, height, and depth) in a memory of controller 202. Controller 202 checks the information of width, height and depth of a block written in the cleaning block administration table, and determines whether or not its own self-traveling cleaner can be in charge of cleaning the block.

Operation Flow of Automatic Cleaning System

Next, an operation flow of the automatic cleaning system will be described with reference to a sequence diagram shown in FIG. 9. The exemplary automatic cleaning system shown in FIG. 9 is configured by single controlling apparatus 100A, two self-traveling dust detection devices 300-1 and 300-2, and two self-traveling cleaners 200A-1 and 200A-2. When cleaning is to be started, controlling apparatus 100A resets the cleaning block administration table.

First, controlling apparatus 100A transmits a detection instruction signal instructing to start dust detection to each of self-traveling dust detection devices 300 (ST201).

Each self-traveling dust detection device 300 having received the detection instruction signal moves in an area to be cleaned, to perform dust detection (ST202).

When each of self-traveling dust detection devices 300-1 and 300-2 has detected dust (ST203) during the dust detection, it measures the amount of dust, transmits to controlling apparatus 100A a dust information signal indicating the dust measured value, the block number and its own ID (ST204), and continues moving (ST205).

Controlling apparatus 100A having received the dust information signal writes the block number, the block location, the amount of dust and the ID of self-traveling dust detection device 300, which are indicated in the dust information signal, into the cleaning block administration table, and sets the cleaning state to the "dust detected" state (ST206).

Then, controlling apparatus 100A transmits a cleaning instruction signal instructing to start removing dust to each self-traveling cleaner 200A (ST207). In this manner, according to the present exemplary embodiment, cleaning by self-traveling cleaner 200A is started while self-traveling dust detection device 300 is performing dust detection.

Self-traveling cleaner 200A having received the cleaning instruction signal reads the cleaning block administration table in controlling apparatus 100A to check whether or not the cleaning state of each of blocks which are larger in size than its own size is the "dust detected" state (ST208).

When self-traveling cleaner 200A has confirmed existence of a block which is in the "dust detected" state, self-traveling cleaner 200A transmits a cleaning reservation signal to controlling apparatus 100A (ST209), moves to the dust location which is in the "dust detected" state (ST210), and starts to remove the dust (ST211).

Controlling apparatus 100A having received the cleaning reservation signal rewrites, as acceptance of the reservation, the ID corresponding to the block location indicated in the cleaning reservation signal in the cleaning block administration table to the ID of self-traveling cleaner 200A, and rewrites the cleaning state corresponding to the block location indicated in the cleaning reservation signal to the "during cleaning" state (ST212).

Incidentally, when self-traveling dust detection device 300 has detected a new dust while self-traveling cleaner 200A is performing cleaning, information of the new dust is additionally written into the cleaning block administration table.

Assume here that, with reference to FIG. 9, the dust container of self-traveling cleaner 200A-1 has been filled with dust (reach a dust collection capacity limit), although some dust still remains (ST213). In this case, self-traveling cleaner 200A-1 transmits a dust remaining signal to controlling apparatus 100A (ST214), and returns to a specified waiting position (ST215).

Controlling apparatus 100A having received the dust remaining signal rewrites the cleaning state corresponding to the block location indicated in the dust remaining signal in the cleaning block administration table to the "dust remaining" state (ST216).

When self-traveling cleaner 200A-2 has completed removing of the dust (ST217), self-traveling cleaner 200A-2 transmits a cleaning completion signal to controlling apparatus 100A (ST218), and thereafter continues reading the cleaning block administration table (checking existence of the "dust detected" or "dust remaining" state) (ST209).

Controlling apparatus 100A having received the cleaning completion signal rewrites the cleaning state corresponding to the block location indicated in the cleaning completion signal in the cleaning block administration table to the "cleaning completed" state (ST219).

When each self-traveling dust detection device 300 has completed dust detection (ST220), it returns to a specified waiting position.

Advantageous Effects

According to the present exemplary embodiment, as described above, a dust accumulated block can be identified by self-traveling dust detection device 300, so that the time necessary for cleaning can be further reduced. Also, since the automatic cleaning system performs cleaning by a plurality of self-traveling cleaners 200A, it is possible to reduce the size of the dust container of each self-traveling cleaner, and thus possible to reduce the size of each self-traveling cleaner 200A.

Incidentally, in each of the above-described exemplary embodiments, self-traveling cleaner 200 or self-traveling dust detection device 300 may be provided with a human sensor. Each of the self-traveling cleaners and self-traveling dust detection devices may temporarily stop its task and evacuate to a position out of human arm's or leg's reach when approach of a human is sensed, and may restart the task after the human has left. This can prevent the self-traveling cleaner or the self-traveling dust detection device from being broken by, for example, being accidentally stomped by a user who does not notice the presence of the self-traveling cleaner or the self-traveling dust detection device.

Also, in each of the above-described exemplary embodiments, measurement of the amount of dust and removing of dust are described mainly on the assumption that the dust is accumulated on a floor. However, it is possible to measure the quantity of and remove dust adhering to a vertical surface such, for example, as a window, a wall of a room or a side surface of fixture/furniture, by using a multiple legs moving type self-traveling cleaner or self-traveling dust detection device having a sucker mechanism or the like at an end of each leg.

Also, in each of the above-described exemplary embodiments, the object to be cleaned is described as dust. However, the object to be cleaned may be spilled food including moisture, or fallen hairs of human or pet. The self-traveling cleaner or the self-traveling dust detection device may, for example, be equipped with an image recognition function to distinguish the kind of dirt. In this case, it may be made possible to write the kind of the object to be cleaned in the dust location administration table or the cleaning block administration table. In addition, a plurality of self-traveling cleaners having different cleaning capabilities from one another may be deployed so that an appropriate one of them can be selected depending on the kind of the object to be cleaned. For example, in a case that the object to be cleaned is water, a self-traveling cleaner having a wiper mechanism may be selected as a cleaner in charge of cleaning the object.

Also, in each of the above-described exemplary embodiments, the waiting position of each self-traveling cleaners is provided at controlling apparatus 100 or 100A. However, the waiting position may be provided separately from the controlling apparatus. For example, the controlling apparatus may be placed at a high position in a room (e.g., a position where the entire room layout can be seen, such, for example, as a position on electric appliance (e.g., an air conditioner) or a floating type robot). In this case, the controlling apparatus may recognize the room layout by using, for example, a compound eye camera, and instruct an easiest moving path for a self-traveling cleaner to move to a dust location. Further, the controlling apparatus may sense an approaching human by using, for example, a human sensor, and instruct each self-traveling cleaner to evacuate. Furthermore, the controlling apparatus may recognize an abnormal operation of a self-traveling cleaner by using, for example, a compound eye camera, and instruct the self-traveling cleaner to return.

Variations

In each of the above-described exemplary embodiments, examples of configuring the present disclosure by hardware are described. However, the present disclosure may be realized by software in conjunction with hardware.

Also, each of the functional blocks used for explaining each of the above exemplary embodiments (FIG. 2, FIG. 4, and FIG. 8) may typically realized as an LSI, which is a kind of integrated circuit. These functional blocks may be individually mounted on separate chips or may be entirely or partially mounted on a single chip. The LSI may occasionally be called, depending on the degree of integration, as IC, system LSI, super LSI or ultra LSI.

Also, the form of integration may not be limited to LSI, and may be a dedicated circuit or a general purpose processor. The other possible forms of integration include a field programmable gate array (FPGA), which is an LSI that is programmable after production, and a re-configurable processor, which is an LSI that has reconfigurable connections or settings of circuit cells.

Further, if a new circuit integration technology substituting the LSI appears in future by progress of the semiconductor technologies or another technology derived from them, the functional blocks may naturally be integrated by using such new technology. One possible technology, for example, might be an application of biotechnologies.

An outline of one embodiment of the present disclosure is as described below.

A self-traveling cleaner in an embodiment of the present disclosure includes: a traveling unit that moves the self-traveling cleaner; a dust detector that detects dust; a dust collector that performs a cleaning function; a communication unit that communicates with a controlling apparatus that communicates with a plurality of self-traveling cleaners including the self-traveling cleaner; and a controller that controls the traveling unit, the dust detector, the dust collector, and the communication unit, wherein, when the dust detector has detected the dust, the controller transmits to the controlling apparatus through the communication unit a signal containing a location of the dust, information identifying the self-traveling cleaner, and information indicating that the self-traveling cleaner performs removing of the dust, and controls the dust collector to collect the dust.

In a case where the self-traveling cleaner is unable to continue removing the dust and all or a part of the dust is remaining at the location of the dust, the controller may transmit information indicating existence of the remaining dust to the controlling apparatus through the communication unit.

In a case where information indicating existence of a first piece of dust which is not removed by another self-traveling cleaner is contained in dust location administration information included in the controlling apparatus, the controller may transmit information indicating to perform removing of the first piece of dust to the controlling apparatus through the communication unit, and may control the traveling unit so as to move the self-traveling cleaner to a location of the first piece of dust.

A controlling apparatus in an embodiment of the present disclosure includes: a communication unit that communicates with each of a plurality of self-traveling cleaners including a first self-traveling cleaner; a storage unit that records, based on information transmitted from each of the self-traveling cleaners, dust location administration information containing locations of a plurality pieces of dust, information identifying self-traveling cleaners that respectively remove the plurality pieces of dust, and respective cleaning states of the plurality pieces of dust; and a controller that controls the communication unit and the storage unit, wherein, when the dust location administration information contains a first piece of dust which is not removed by any of the plurality of self-traveling cleaners and the controller has received from the first self-traveling cleaner through the communication unit information indicating that the first self-traveling cleaner will remove the first piece of dust, the controller will not accept information received from any other self-traveling cleaner among the plurality of self-traveling cleaners and indicating to perform removing of the first piece of dust, until receiving from the first self-traveling cleaner information indicating that removing of the first piece of dust has been completed or information indicating that the first self-traveling cleaner is unable to continue removing the first piece of dust and that at least a part of the first piece of dust is remaining.

An automatic cleaning system in an embodiment of the present disclosure includes a single controlling apparatus, and a plurality of self-traveling cleaners including a first self-traveling cleaner, wherein the first self-traveling cleaner includes: a traveling unit that moves the first self-traveling cleaner; a dust detector that detects dust; a dust collector that performs a cleaning function; a first communication unit that communicates with the controlling apparatus; and a first controller that controls the traveling unit, the dust detector, the dust collector, and the first communication unit, wherein the controlling apparatus includes: a second communication unit that communicates with each of the plurality of self-traveling cleaners; a storage unit that records, based on information transmitted from each of the plurality of self-traveling cleaners, dust location administration information containing locations of a plurality pieces of dust, information identifying self-traveling cleaners that respectively perform removing of the plurality pieces of dust, and respective cleaning states of the plurality pieces of dust; and a second controller that controls the second communication unit and the storage unit, wherein, in a case where information indicating existence of a first piece of dust which is not removed by other self-traveling cleaners is contained in the dust location administration information, the first controller transmits information indicating to perform removing of the first piece of dust to the controlling apparatus through the first communication unit, and controls the traveling unit so as to move the first self-traveling cleaner to a location of the first piece of dust, and wherein, when the second controller has received the information indicating that the first self-traveling cleaner performs removing of the first piece of dust from the first self-traveling cleaner through the second communication unit, the second controller will not accept information received from any other self-traveling cleaners among the plurality of self-traveling cleaners and indicating to perform removing of the first piece of dust, until receiving from the first self-traveling cleaner information indicating that removing of the first piece of dust has been completed or information indicating that the first self-traveling cleaner is unable to continue removing of the first piece of dust and that at least a part of the first piece of dust is remaining.

The automatic cleaning system may further include a self-traveling dust detection device that performs dust detection without performing cleaning.

The locations of the plurality pieces of dust may include information that identifies blocks each having a predetermined location and a predetermined size.

The present disclosure is applicable to an apparatus or system that automatically performs cleaning over a wide area without relying on a manual operation.

What is claimed is:

1. A self-traveling cleaner and a system including a single controlling apparatus; and a plurality of self-traveling cleaners including the self-traveling cleaner, the controlling apparatus comprising a first communication interface that communicates with each of the plurality of self-traveling cleaners; a storage that records dust location administration information containing locations of a plurality of pieces of dust, information identifying self-traveling cleaners that respectively perform removing of the plurality of pieces of dust, and respective cleaning states of the plurality of pieces of dust; and a first controller that controls the first communication interface and the storage, the self-traveling cleaner comprising:
a drive that moves the self-traveling cleaner;
a dust detector that detects dust;
a dust collector that performs cleaning;
a communication interface that communicates with the controlling apparatus that communicates with the plurality of self-traveling cleaners; and
a controller that controls the drive, the dust detector, the dust collector, and the communication interface,
wherein, when the dust detector has detected the dust, the controller transmits, to the controlling apparatus through the communication interface, a signal containing a location of the dust, information identifying the self-traveling cleaner, and information indicating that the self-traveling cleaner performs removing of the dust, and controls the dust collector to collect the dust, and
the signal sets a cleaning state of the dust in dust location administration information included in the controlling apparatus to a during-cleaning state
when information indicating existence of a first piece of dust which is not removed by a first self-traveling cleaner, of the plurality of self-traveling cleaners, other than the self-traveling cleaner is contained in the dust location administration information, the controller transmits information indicating to perform removing of the first piece of dust to the controlling apparatus through the communication interface, and controls the drive to move the self-traveling cleaner to a location of the first piece of dust, and
wherein, when the information indicating that the self-traveling cleaner performs removing of the first piece of dust from the self-traveling cleaner is received by the first controller of the control apparatus through the first communication interface, information received from a second self-traveling cleaner, of the plurality of self-traveling cleaners, other than the self-traveling cleaner and indicating to perform removing of the first piece of dust will not be accepted by the first controller, until receiving, from the self-traveling cleaner, information indicating that removing of the first piece of dust has been completed or information indicating that the self-traveling cleaner is unable to continue removing of the first piece of dust and that at least a part of the first piece of dust is remaining.

2. The self-traveling cleaner according to claim 1, wherein, when the self-traveling cleaner is unable to continue removing the dust and at least a part of the dust is remaining at the location of the dust, the controller transmits information indicating existence of the remaining dust to the controlling apparatus through the communication interface.

3. A controlling apparatus and a system including the controlling apparatus as a single controlling apparatus; and a plurality of self-traveling cleaners including a first self-traveling cleaner, wherein the first self-traveling cleaner comprises: a drive that moves the first self-traveling cleaner; a dust detector that detects dust; a dust collector that performs cleaning; a first communication interface that communicates with the controlling apparatus; and a first controller that controls the drive, the dust detector, the dust collector, and the first communication interface, the controlling apparatus comprising:
a communication interface that communicates with each of the plurality of self-traveling cleaners;
a storage that records, based on information transmitted from each of the plurality of self-traveling cleaners, dust location administration information containing locations of a plurality of pieces of dust, information identifying self-traveling cleaners that respectively perform removing the plurality of pieces of dust, and respective cleaning states of the plurality of pieces of dust; and
a controller that controls the communication interface and the storage,
wherein, when the dust location administration information contains information indicating existence of a first piece of dust which is not removed by a self-traveling cleaner, of the plurality of self-traveling cleaners, other than the first self-traveling cleaner, first information is transmitted by the first controller of the first self-traveling cleaner through the first communication interface, the first information indicating to perform removing of the first piece of dust,
wherein, when the controller has received the first information indicating that the first self-traveling cleaner performs removing of the first piece of dust from the first self-traveling cleaner through the communication interface, the controller sets a cleaning state of the first piece of dust in the dust location administration information stored in the storage to a during-cleaning state, and the controller will not accept information received from a self-traveling cleaner, of the plurality of self-traveling cleaners, other than the first self-traveling cleaner and indicating to perform removing of the first piece of dust, until receiving, from the first self-traveling cleaner information, indicating that removing of the first piece of dust has been completed or information indicating that the first self-traveling cleaner is unable to continue removing of the first piece of dust and that at least a part of the first piece of dust is remaining.

4. An automatic cleaning system including: a single controlling apparatus; and a plurality of self-traveling cleaners including a first self-traveling cleaner,
wherein the first self-traveling cleaner comprises:
a drive that moves the first self-traveling cleaner;
a dust detector that detects dust;
a dust collector that performs cleaning;
a first communication interface that communicates with the controlling apparatus; and
a first controller that controls the drive, the dust detector, the dust collector, and the first communication interface,
wherein the controlling apparatus comprises:
a second communication interface that communicates with each of the plurality of self-traveling cleaners;
a storage that records, based on information transmitted from each of the plurality of self-traveling cleaners, dust location administration information containing locations of a plurality pieces of dust, information identifying self-traveling cleaners that respectively perform removing of the plurality pieces of dust, and respective cleaning states of the plurality pieces of dust; and
a second controller that controls the second communication interface and the storage,
wherein, when information indicating existence of a first piece of dust which is not removed by a self-traveling cleaner other than the first self-traveling cleaner is contained in the dust location administration information, the first controller transmits information indicating to perform removing of the first piece of dust to the controlling apparatus through the first communication interface, and controls the drive to move the first self-traveling cleaner to a location of the first piece of dust, and
wherein, when the second controller has received the information indicating that the first self-traveling cleaner performs removing of the first piece of dust from the first self-traveling cleaner through the second communication interface, the second controller will not accept information received from a self-traveling cleaner, of the plurality of self-traveling cleaners, other than the first self-traveling cleaner and indicating to perform removing of the first piece of dust, until receiving, from the first self-traveling cleaner, information indicating that removing of the first piece of dust has been completed or information indicating that the first self-traveling cleaner is unable to continue removing of the first piece of dust and that at least a part of the first piece of dust is remaining.

5. The automatic cleaning system according to claim 4, further comprising a self-traveling dust detection device that performs dust detection without performing cleaning.

6. The automatic cleaning system according to claim 4, wherein the locations of the plurality pieces of dust include information that identifies blocks each having a predetermined location and a predetermined size.

* * * * *